United States Patent
Morris et al.

(10) Patent No.: US 8,442,910 B2
(45) Date of Patent: May 14, 2013

(54) SYSTEMS AND METHODS FOR USING VERIFIED INFORMATION CARDS IN A COMMUNICATIONS NETWORK

(75) Inventors: W. Kerry Morris, Sharpesburg, GA (US); Christen J. Colson, Cumming, GA (US); Mitchell S. Johnson, Atlanta, GA (US)

(73) Assignee: Equifax, Inc., Atlanta, GA (US)

( * ) Notice: Subject to any disclaimer, the term of this patent is extended or adjusted under 35 U.S.C. 154(b) by 458 days.

(21) Appl. No.: 12/716,775

(22) Filed: Mar. 3, 2010

(65) Prior Publication Data

US 2010/0228624 A1 Sep. 9, 2010

Related U.S. Application Data

(60) Provisional application No. 61/156,942, filed on Mar. 3, 2009.

(51) Int. Cl.
*G06Q 40/00* (2012.01)

(52) U.S. Cl.
USPC ............... 705/39; 705/30; 705/23; 705/28; 705/1.1; 705/14.47

(58) Field of Classification Search ........... 705/1.1, 705/39, 30, 14.47, 28, 23; 709/245, 219; 235/449, 492, 470
See application file for complete search history.

(56) References Cited

U.S. PATENT DOCUMENTS

| | | | |
|---|---|---|---|
| 5,948,061 A | 9/1999 | Merriman et al. | |
| 6,321,339 B1 * | 11/2001 | French et al. | 726/2 |
| 7,680,819 B1 * | 3/2010 | Mellmer et al. | 707/783 |
| 2004/0205243 A1 | 10/2004 | Hurvig et al. | |
| 2009/0192907 A1 | 7/2009 | Bossemeyer, Jr. et al. | |

FOREIGN PATENT DOCUMENTS

| | | |
|---|---|---|
| EP | 1 988 483 A2 | 11/2008 |
| WO | 2010/101997 A2 | 9/2010 |

OTHER PUBLICATIONS

Kim Cameron; "Proposal for a Common Identity Framework: A User-Centric Identity Metasystem"; pp. 1-30; Oct. 5, 2008.*
International Application No. PCT/US2010/026040, International Preliminary Report on Patentability mailed Sep. 15, 2011, 6 pages.
International Application No. PCT/US2010/026040, International Search Report and Written Opinion mailed on Nov. 16, 2010, 8 Pages.
Open ID Authentication 2.0—Final, 38 pages, Dec. 5, 2007 http://openid.net/specs/openid-authentication-2_0.html.
Austel, et al., "Secure Delegation for Web 2.0 and Mashups a Position Statement for the 2008 Workshop on Web 2.0 Security and Privacy," pp. 1-7, ® 2008 IBM Corporation.

(Continued)

*Primary Examiner* — John H Holly
(74) *Attorney, Agent, or Firm* — Kilpatrick Townsend & Stockton LLP (57) ABSTRACT

Digital information cards associated with verified information about users are described. The cards can be used to optimize a network communications experience or interaction for a user and a commercial entity, such as a website provider. The cards can be user-centric in that the user can control access to information associated with the card. A website can access the information claim using a link of the information card and can customize a user's website experience based on the verified information claim.

21 Claims, 6 Drawing Sheets

OTHER PUBLICATIONS

Paper entitled "An Implementer's Guide to the Identity Selector Interoperability Profile V1.0," pp. 1-74, Apr. 2007.

Cameron, et al., "Proposal for a Common Identity Framework: A User-Centric Identity Metasystem," pp. 1-30, Oct. 5, 2008.

Paper entitled "Microsoft's Vision for an Identity Metasystem," pp. 1-9, May 2005 http://www.identityblog.com/stories/2005/07/05/IdentityMetasystem.htm.

* cited by examiner

SYSTEMS AND METHODS FOR USING VERIFIED INFORMATION CARDS IN A COMMUNICATIONS NETWORK

CROSS-REFERENCE TO RELATED APPLICATIONS

This application claims priority to U.S. Provisional Application Ser. No. 61/156,942, titled "Systems and Methods for Using Verified Digital Information Cards in a Communications Network," and filed Mar. 3, 2009, the entirety of which is incorporated herein by this reference.

TECHNICAL FIELD

The invention relates generally to information cards, and more particularly to systems and methods for using verified information cards to facilitate electronic transactions over a communications network, such as the Internet.

BACKGROUND

The rapid growth of large-scale communications networks, such as the Internet, has sparked increased interest in online advertising and electronic commerce. Existing online advertising techniques use various computer programs that include various analytical techniques to identify a specific user while the user is conducting search queries or to monitor other online behavior. These programs typically utilize existing session tracking technology, commonly referred to as cookies. Cookies in the context of computing include text files that collect information about pages and advertisements that a web user has visited or any other activity during an Internet browsing session. The information contained in cookies is shared between websites, which allows websites to obtain information about a user's online behavior seamlessly, oftentimes without complete knowledge or control by the user.

Existing systems use data contained in cookies to infer consumer identity or demographic data, and use this data to feed marketing tools such as search algorithms and advertising models. These systems and methods, however, suffer many limitations. First, cookies contain a limited amount of data, which typically includes data points related to a set of defined activities occurring at a computer terminal during a web session. These activities are directed to the particular computer rather than to an individual user. For example, the data may be related to multiple users that use the particular computer.

One issue with electronic communications over the Internet is that verifying information asserted by an individual user is difficult. For example, a web user may register on a particular website with an incorrect name and address. In existing systems, the incorrect information is captured in a cookie and shared with other sources. As a result, search algorithms, advertising models, and other demographic functions are unable to confirm the veracity or authenticity of the information.

In addition, privacy concerns raised by the browser activity-tracking feature of cookies and the inconspicuous way in which cookies are transmitted and shared can be undesirable. The user has little knowledge of or control over the data being captured and shared.

Others have developed solutions to address the shortcomings of existing technology using cookies. One example is the cookie anonymizer tool, which prevents sites from learning the source of cookie data. Another solution is to allow cookies to be disabled. Yet another solution is site sharing, which requires a user to register to share data with a particular website. Each of these solutions, however, fails to address adequately the privacy and verification issues associated with existing systems.

Information cards allow a user to validate his or her identity to an online service provider, such as a website provider. For example, a user can obtain an information card and add "claims" to it. "Claims" are assertions made by the user that are accessible by the website provider. Examples of "claims" include the user's name, user's age, and user's address. Depending on the nature of the online interaction, a wide range of potential claims may be made. Often, however, the claims are unverified, leaving information cards susceptible to fraud or other misuse.

Systems and methods for using verified information cards are desirable. Systems and methods for using verified information cards to decrease misuse and provide more user control over the user's information and behavioral activities are also desirable.

SUMMARY

Aspects and embodiments of the present invention provide systems and methods for using verified information cards to optimize a network communications experience or interaction for a user and a commercial entity, such as a website provider. Certain embodiments of the present invention provide a user-centric information card to facilitate exchanging more accurate information relating to a user with another party, such as a website, over a communications network. In some embodiments, an information card is established for a user by including a link to at least one verified information claim, which may be a data element in a data file and to which the user has provided permission to access. A website can access the information claim using the link and can customize a user's website experience based on the verified information claim.

In one aspect, an information card stored on a computer-readable medium is provided. The information card includes a link that can provide access to an information claim in an element of a data file. The information claim is associated with a user. The information claim is verified using credit data about the user and is designated by the user as capable of being accessed.

In an embodiment, the information claim is verified by analyzing a credit file comprising credit data associated with the user. A question and an answer to that question associated with the information claim are generated based on the credit file. The question is presented to the user. The answer to the question is received from the user.

In an embodiment, designating that the information claim is capable of being accessed includes presenting information claims, including the information claim. A designation associated with the information claim is received from the user. The designation represents that the user allows the information claim to be accessible using the information card.

In an embodiment, the information claims include at least one other information claim that is not capable of being accessed by a party other than the user and an information card provider.

In an embodiment, the information claim includes at least one of demographic data of the user, financial information of the user, or an advertising preference of the user.

In an embodiment, the information card can include a session identifier representing that a web page customized using the information claim was provided to the user.

In an embodiment, the information claim is verified using credit data bout the user prior to being stored on the computer-readable medium. The information card is designated by the user as capable of being accessed prior to being stored on the computer-readable medium.

In another aspect, a link to an information claim in an element of a data file is received. The link is associated with an information card of a user. The information claim has been verified using credit data about the user and the information claim has been designated by the user as capable of being accessed. The information claim is accessed using the link. A web page is configured based on the information claim. The web page is to be provided to the user.

In an embodiment, the information claim is accessed using the link and the information claim is used to customize the web page to be provided to the user without receiving an identity of the user.

In an embodiment, the web page customized using the information claim is provided to the user. A session identifier is provided to the information card of the user. The session identifier represents that the web page customized using the information claim was provided to the user.

In an embodiment, the web page is configured by selecting an advertisement based on the information claim. The web page is configured to include the advertisement that was selected based on the information claim.

In an embodiment, the web page is configured by performing a search for information using the information claim. The web page is configured to include the search results from the search for information using the information claim.

In another aspect, a system is provided that includes a processor and a computer-readable medium. The computer-readable medium has code stored on it. The code is executable by the processor to cause the system to perform actions. For example, the system can receive a link to an information claim in an element of a data file. The link is associated with an information card of a user. The information claim has been verified using credit data about the user and the information claim has been designated by the user as capable of being accessed. The system accesses the information claim using the link. The system configures a web page based on the information claim. The web page is to be provided to the user.

In another aspect, data elements that include information about a user are received. A command to allow a data element to be accessible is received at an information card device. A command is received at the information card device to allow another data element to be inaccessible to a party other than the user and an information card device. The information card is configured to include a link that can provide access to the data element and that is configured to prevent access to the other data element. The information card is stored on a computer-readable medium.

In an embodiment, a representation of web activity of the user is received. The representation of the web activity of the user is stored in a data element.

In an embodiment, a data element included an identity of the user. The identify of the user has been authenticated.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DESCRIPTION

Aspects and embodiments of the present invention provide systems and methods for using verified information cards to optimize a network communications experience or interaction for a user and a commercial entity, such as a website provider. Certain embodiments of the present invention provide a user-centric information card to facilitate exchanging more accurate information relating to a user with another party, such as a website, over a communications network. In some embodiments, one or more information cards are established for a user. The information card may be any type of information card, also known as i-cards. Examples of information cards include i-cards using configurations developed in the Higgins Project or OpenID. Other information cards may be used, however.

The user can interact with the information card through a web-based interface provided by a software application located on a network or locally on a user's computer. The web-based interface may be a graphical user interface (GUI), hypertext markup language (HTML) form or any other suitable mechanism for receiving data input from a user. An example of a web-based interface includes a "digital wallet" that can be used to manage information cards associated with the user. Examples of a digital wallet include Windows® CardSpace or the Higgins Identity Selector. The web-based interface may be used to interact with a server managed by a trusted third party, such as Equifax Inc. located in Atlanta, Ga. An example of a server includes a web server. In some embodiments, the user can provide personal information to the server through the web-based interface using the information card. The server includes software that can access a credit file or other consumer-type data associated with a user from a database, such as a credit database managed by Equifax. Examples of databases managed by Equifax include ACRO credit database, Product Registration Card database, Total Source XL demographic and financial database, and The Work Number income and employment data. Databases accessible via information cards according to various embodiments of the present invention can be indexed to facilitate efficient access to the data in a secure manner. A processor on the server can execute an algorithm included in the software program to verify the user's identity. One example of a verification algorithm is described in U.S. Pat. No. 6,321,339, which is incorporated by reference in this application.

After verifying the user, the software can establish an account for the user in an information database associated with the server. The account can be associated with the user and the user's information card. For example, the software can write information to the information card that links the information card to the account, such as by linking to the data stored in the information database associated with the account. The information can include a digital certification, a two-way encryption, or a link that associates the information card to the account via the web server and a network protocol instruction. In other embodiments, data from an information database may be uploaded and stored directly on the information card or to a location associated with the web-based interface. Users may be required to enter a username and password to access the data via the information card.

In establishing the account, the server can obtain credit file data, which can include consumer-type data, from the credit file associated with the user or another database and include the credit file data in the information database. Examples of consumer-type data that may be credit data include name, age, sex, address, former address, martial status, income level, verified income, employer identification, aliases, former names, tradelines, risk score, debt burden, lines of credit, payment history, income, assets, segmentation codes, life events, in-market indicators, and background information. In some embodiments, the user can modify elements containing data representing consumer-type data associated with the user.

The server may also receive additional personal data from the user and include the additional personal data in the information database. Examples of additional personal data include current interests, likes, dislikes, activities, identification of organizations that the user is a member, accolades, preferences, travel preferences, preferred vendors of products and services, nicknames, pet names, and any other data that the user wishes to provide. The server may verify some of the additional personal data before including it in the information database. In some embodiments, the additional personal data is included without verification. Offers or other benefits may be provided to users that permit information sharing via information cards or that participate in a verification program.

In addition, the server may receive user behavior or other user data from one or more websites and include the user behavior or other data in the information database. Examples of user behavior or other data include a user visit to a website, the time the user visited the website, IP address, last URL visited, site visit history, zipcode+4, interests, hobbies, identification of any products or services purchased using the website, identification of pages browsed, and other data that can include data typically stored as "cookies" on a user's computer. In some embodiments, the server can provide a user interface with which a user can review the user behavior or other data that is captured. The user interface can be configured to allow users to modify, delete and control the data, such as by controlling access to the data.

As described above, embodiments of the account associated with a user in the information database can include the various types of data and data can be from several sources. An example of the information database is a relational database that can be configured using a database server executing database server software. The data may be a data file associated with the account. The data file can include elements. Each element can include content representing a piece of information associated with the user. Each element may also include an identifier that includes data representing the source of the content, a configurable security level, a date on which the content was added, and any additional information supporting data management.

The configurable security level can identify whether an element can be shared with a third party, such as a website. In some embodiments, the configurable security level can be configured by the user through the web-based interface. For example, an element may contain content representing a current income of the user. The user can configure the configurable security level to prevent access to all third parties to the element containing content representing the current income of the user. Various security level configurations can be implemented using various embodiments of the present invention. In some embodiments, three levels are used. A first level can represent that the element can be shared with any entity that accesses the data file through the information card. A second level can represent that the element can be shared with certain entities that access the data file through the information card, but not others. In some embodiments, the second level can be modified by the user to identify the entities for which the user is providing access or to identify the entities that the user is not providing access. A third level can represent that the element cannot be shared with any entities accessing the credit file via the information card. Certain embodiments of the present invention allow the user to configure the configurable security level at any time and in real-time. In some embodiments, the server can allow a user to select or input rules governing data element sharing. For example, users can share certain data elements, such as income, without revealing the users' identity. Rules can include factors with which the server determines whether to share information. Examples of factors include data type, nature of relationship with the entity requesting data, industry of the requesting entity, time of day of the request, and location of interaction.

In some embodiments, the identifier for each element can include a unique label that is linked to the user's identity via a table stored in the information database. The unique label can facilitate data sharing with other entities without requiring a user to share the user's identity. For example, a user may visit a web site to shop for a credit card. Instead of completing online forms or providing personal information, the user can provide the unique label received from a source, such as Equifax, Inc. for example. The web site can provide the unique label to the source, which can return the data that the site can use to adjust a message, offer, etc. that is provided to the user. The site and the user can benefit by sharing information without the user's identity being revealed to the site. In addition, the identifier can include a unique label for the party with which the user shares information to facilitate identity security further. For example, other entities may be not be able to share the information and unique label to determine the same user shared information with each entity, minimize data security risk, since the unique label is relevant to one entity.

In some embodiments of the invention, the server can provide security services to prevent unauthorized use of the information card of a user. One such service may be analytical models that track information card usage patterns and offline user data to identify potential misuse. For example, if a user typically uses the information card from an IP address originating in New York during the early evening and the user's employment does not require travel, but the user's information card is used from an IP address originating in Thailand in the early morning, an instance of fraud may exist. The server can be configured to detect such potential fraud and inform the user, and potentially entities with whom the information is being shared via the potentially fraudulent use, of the security assessment via scores delivered at the point of interaction, alerts delivered proactively, after the fact analyses of usage, and other methods.

In some embodiments, the elements can be organized into one or more fields in the information database. Elements can be organized into fields based on one or more identifiers. For example, one field can include elements associated with a first security level and a second field can include elements associated with a second security level, and the third field can include elements associated with the third security level. In other embodiments, the elements are organized into fields based on the source of the content contained within the elements.

Optional, non-exclusive features of certain embodiments of the present invention include the ability of a user to control third-party access to the user's personal and behavior information and the ability of a website, or other third party, to receive data about the user that can be verified or is otherwise unavailable from another source without substantial difficulty in obtaining the data. Embodiments of the information database can be configured to (1) maintain a relationship between the data file and the user; and (2) maintain a relationship between data elements and the identifiers within the elements to support user control, user privacy, and third-party access to one or more elements within the data file.

Certain embodiments of the present invention allow websites that the user visits to access the data that is associated with the user and that is stored in the information database. A data engine located on a web server associated with the database can be executed by a processor on the web server to manage access to the data file associated with the user. For example, a user can visit a website and provide the user's information card that includes a link to the data file associated with the user. The link can include a user identifier that can be transmitted to the web server over a communication network, along with an information request and an identification of the website accessing the data. In some embodiments, user behavior at other websites is also transmitted to the website. The user behavior data can be provided to a card issuer or the server and stored for later use. Upon execution, the data engine is configured to receive the user identifier and data request. The data engine can access the data file stored in the information database by using the user identifier to identify the data file associated with the user and by obtaining elements using parameters that may be in the data request and using the configurable security level associated with the elements that meet the request. If user behavior is received from the website, the data engine can apply appropriate identifiers to the user behavior data and store the user behavior data into elements of the data file in the information database.

The data engine can return content of elements meeting the parameters included in the request and/or content of elements associated with an appropriate configurable security level to the website. The website can use the content to optimize a user's experience on the website, improve targeted advertising features, or otherwise personalize the user's experience on the website. For example, the website can use the content to display search results automatically as the user enters the website, where the search results are based on searches using content received from the web server. In some embodiments, the request includes a request parameter that the web server return verified content associated with the user. In some embodiments, websites offer benefits to users that use the card to share information. Information cards according to certain embodiments include business rules, or interface with website systems to drive business rules, to deliver customized content or offers.

Certain embodiments allow advertisers and online merchants to obtain a better understanding of the user browsing a site or store and allow the user to share content personalized to the user with advertisers and online merchants, and to control that sharing. For example, the content may suggest that a user is interested in purchasing a new car and has the ability to purchase a car within a specified cost range. The third party can use the information to sell advertisements to other merchants that advertise products meeting the criteria personalized to the user. Alternatively, the third party may automatically direct the user to information about products that the user's content suggests the user may have an interest. Embodiments of the present invention can replace registration forms that a user may need to fill out on various websites by allowing a user to indicate content related to the product or service for which the user is shopping so the online retailer can better match goods and services to the consumer's needs. Additionally, certain features allow the user to share financial information at the point of purchase, which may be applicable to credit offers and/or discounts or reward programs. In some embodiments, multiple types of ads can be presented that may be personalized to the user based on information accessible via the information card.

In some embodiments, the information card and server can allow users to control offline marketing preferences. For example, users can indicate a preference for types of direct mail marketing, email marketing, and telephone call marketing, television ad marketing, and marketing through other communications that the user wishes to receive. The preference may be communicated to marketers, industry groups, and government organizations. For example, a user may indicate that they do not wish to receive any direct mail marketing or email marketing, except communications related to purchases by the user of electronics in the next sixty days. The server can communicate the preferences on the user's behalf to marketers that send direct mail for marketing purposes and to the Direct Marketing Association "Do Not Mail" list, and State government opt out lists, and other similar lists maintained by an industry organization, government entity, private organization, or other entity.

Other embodiments and features provide mobile or wireless advertising optimization. In certain embodiments, the information card is integrated into, or otherwise accessible using, a mobile device. When a user enters a merchant's store, the information card is provided to a receiver terminal at the merchant site with access to authorized data related to the user. The receiver terminal alerts the merchant to critical data concerning the user, which can be used to optimize the user's shopping experience.

The following describes selected figures that accompany the present application and that illustrate some examples of the disclosed inventive concepts. The drawings merely illustrate examples. It will be apparent to those skilled in the art that modifications and variations can be made without departing from the scope or spirit of the present invention. For example, features illustrated or described as part of one embodiment may be used in connection with another embodiment to yield a still further embodiment.

Illustrative System Implementation

Figure 1:
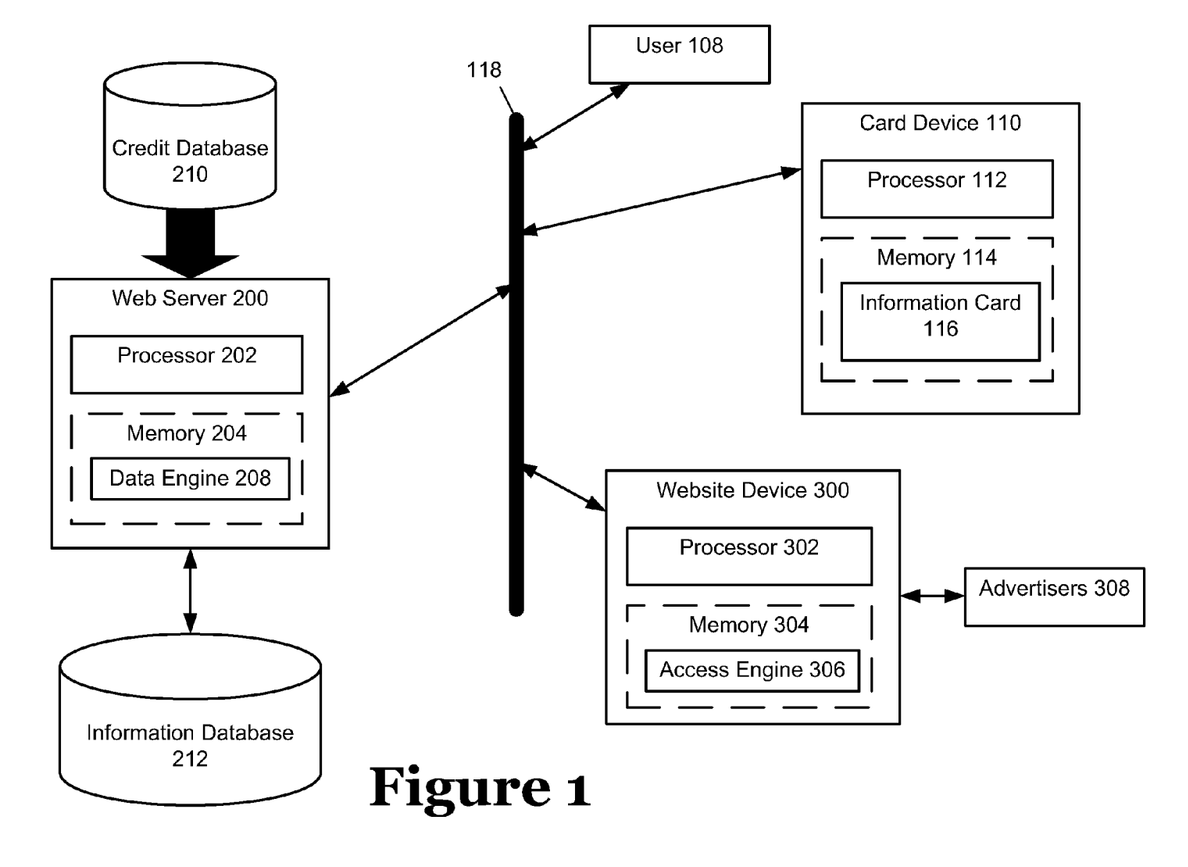
FIG. 1 is a block diagram of a system for generating and using information cards according to an embodiment of the present invention.

Systems and methods according to various embodiments of the present invention may be implemented on a variety of different systems. FIG. 1 illustrates architecture of one system according to one embodiment. The system illustrates a user 108 that can communicate with various components over a network 118. The network 118 may be any type of network. Examples of network 118 include an internet and an intranet. The user 108 can use a processor-based device, such as a personal computer or mobile device, to access the network 118 and communicate over it. The device associated with user 108 can include a web browser through which the user 108 can communicate. For example, the user 108 can communicate with a card device 110 over the network 118 using a web browser.

The card device 110 may be a computer or a server that includes a processor 112 and that can be configured to store and manage an information card 116 in a computer-readable medium, such as memory 114. Examples of memory 114 include magnetic storage device, optical storage device, semiconductor storage device, random access memory, temporary storage device, and persistent storage device. The information card 116 may be stored in a digital card wallet. Examples of a digital card wallet include Windows® CardSpace, Parity Azigo, and Higgins Identity Selector. The digital card wallet can provide an interface through which the user 108 can establish and manage the information card 116. In some embodiments, the card device 110 is included in a device controlled by the user 108. In other embodiments, the card device 110 is a separate device controlled by an information card provider or is included in a web server 200 managed by a trusted third party. Any type of information card can be used and can be from any source.

Figure 2:
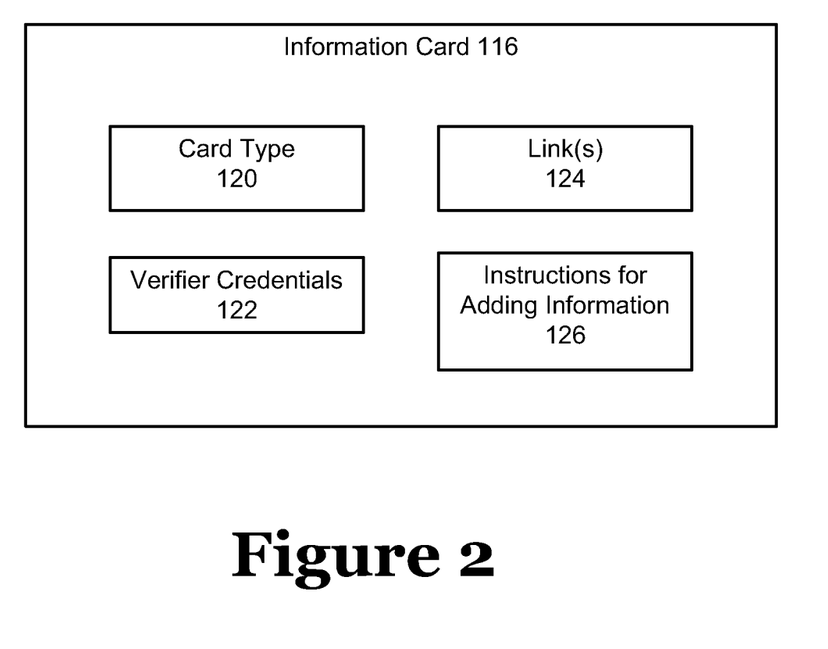
FIG. 2 is a block diagram of an information card according to an embodiment of the present invention.

FIG. 2 depicts one embodiment of the information card 116. The information card 116 can include information such as card type 120, verifier credentials 122, one or more links 124, and instructions for adding information 126. Card type 120 can specify one of various card types—e.g. age verification card, login card, etc. In some embodiments, the card type 120 may also include the source of the information card 116. The verifier credentials 122 can include identification and credential information for the entity that has verified the claims of the user to which the information card 116 provides access. For example, the credential may be a unique key that is associated only with the verifying entity. In some embodiments, the verifier credentials 122 can also include a highest level at which the claims have been verified.

One or more links 124 can include a link by which a website server can access the claims, including claims that have been verified using credit data about the user and claims that have been designated by the user as being accessible. Instructions for adding information 126 can provide a website with information on how to provide data about a user's visit to the website such that the information can be included with the data associated with the information card 116.

In some embodiments, the digital card wallet can provide an interface through which the user 108 communicates with the web server 200 to establish an account. For example, the user 108 can establish the information card 116 through the digital card wallet by providing claims, also known as assertions, to be associated with the card. The card device 110 is configured to store the claims associated with the user in memory 114 and provide an identifier on the information card 116 that identifies the user and links the information card 116 to the claims. The user 108 can provide the information card 116 to the web server 200 through the network 118 using the digital card wallet or another web-based application, such as a web-based application provided by the web server 200. The user 108 can use the information card 116 to establish an account with the web server 200.

Web server 200 includes a processor 202 and a computer-readable medium, such as memory 204. The web server 200 may be any type of processor-based device capable of exchanging information over the network 118 with a second device. Memory 204 may be adapted to store computer-executable code and data. Computer-executable code may include a data engine 208 that is capable of receiving data from sources such as the user 108, a credit database 210 and a website device 300, and organize the data in an information database 212. The data engine 208 may also manage requests for data from the website device 300 and provide requested content associated with the user 108.

The credit database 210 may be a database managed by a credit bureau, such as Equifax. In some embodiments, the credit database 210 represents multiple databases managed by one or more entities, where each database includes certain types of consumer-type data that is not necessarily just credit data, but can include additional types of consumer-type data. The credit database 210 can include data elements representing demographics, retail purchases, life events, affinity, credit-related data and other types of data associated with individuals. The data engine 208 can periodically requested updated data from the credit database 210 and store the data in the information database 212. The updated data may be requested for data associated with users for which information cards are received.

When the data engine 208 receives a request from the user 108 to establish an account and receives the information card 116, the processor 202 can execute a verification algorithm included in the data engine 208. The verification algorithm can verify the identity of the user 108 and can verify one or more claims made by the user 108.

After verification, the data engine 208 establishes an account for the user by storing a data file in the information database 212 and writing a user identifier and a link in the information card 116. The user identifier can identify the user. In some embodiments, the user identifier also identifies the entity that manages the web server 200 and that verified the user's identity. The link may be the location of the web server 200 over the network 118.

The information database 212 may be a relational database that is configured to store the data file associated with the user. The data file can include elements contain content representing information about the user from various sources. Examples of sources include the credit database 210, the user 108 and the website device 300. Other sources are possible. Examples of information from the website device 300 include cookie-type information obtained by the website device 300 and provided to the web server 200 over the network 118.

The elements can be organized into one or more fields in the information database 212. Elements can be organized into fields based on one or more identifiers. The identifiers can identify the source of the information and an associated configurable security level. The configurable security level can be configured by the user 108 through the digital wallet. For example, a user 108 can access a web-based application provided by the digital wallet and use the link on the information card to view a list of all or some elements stored in the information database and associated with the user 108. The web-based application can provide a selectable menu with which the user 108 can select a security level to be associated with each of the elements displayed.

Examples of elements included in a data file associated with the user 108 and stored in the information database 212 includes the following: name, age, sex, address, date of birth, occupation, income, open tradelines, closed tradelines, past purchases, previous addresses, website viewing history, website viewing dates, website purchases, favorite food, marital history, favorite car, favorite color. Any type of information can be included. Each element can be associated with an identifier with which the user 108 can control third-party access to the elements.

The website device 300 includes a processor 302 that can execute code stored in memory 304. An example of code includes an access engine 306. The access engine 306 can be configured to generate one or more web pages in accordance with a configuration by the website owners. The access engine 306 can also, upon a command from the user 108, receive the information card 116 and use a link and user identifier associated with the information card 116 to transmit a request over the network 118 to the web server 200. The request can include a request to confirm the identity of the user 108 associated with the information card 116 and a request for content representing information about the user. In some embodiments, the request can include parameters specifying the type of information requested.

The link included in the information card 116 provides website device 300 with a secured communication link across network 118 to the web server 200, which may receive data from the information database 212 and transmit that data to website device 300. In certain embodiments of the present invention, website device 300 may provide a retail or merchant website or web portal. In other embodiments, website device 300 may provide a search engine service and is in communication with one or more advertisers 308. The advertisers 308 may pay the search engine to provide targeted ads based on search words or other criteria. The search engine can use the information about the user to provide better-targeted advertisements to the user 108 using the information obtained from the web server 200.

In other embodiments, the user 108 is associated with a mobile device that is configured to provide the information card 116 wirelessly to a merchant device located at a physical location, directly or through the network 118. The merchant device can use the information card 116 to access information about the user 108 from the web server 200 over network 118. The merchant can use the information to provide goods tailored to the user 108 based on the information or otherwise optimize the user's experience in the merchant's physical location based on the information.

Data engines according to some embodiments can analyze elements associated with a user and provides results from the analysis to a website that requested information. For example, a data engine may accesses content representing information about a user from the data file for the user and analyze the information to predict goods or products that would likely interest the user or predict purchases the user may make within a certain time period, such as one month, to generate predictive results.

Illustrative Information Card Methods

Figure 3:
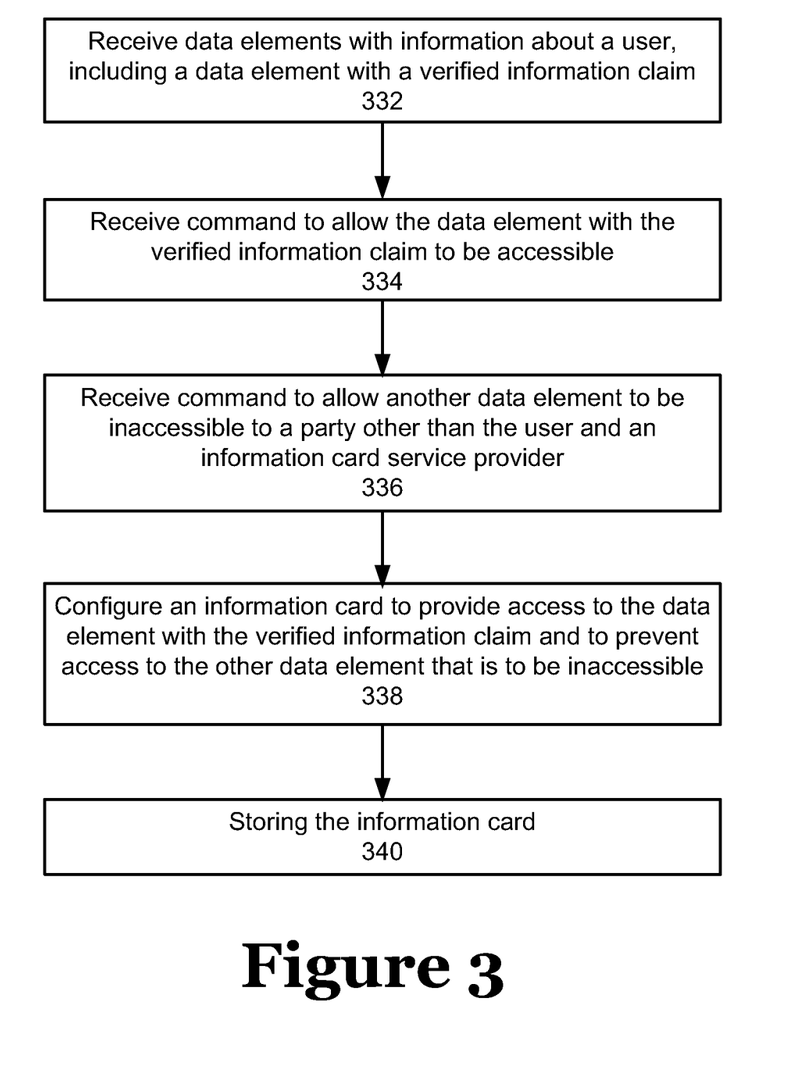
FIG. 3 is a flow diagram of a method for configuring an information card for a user according to an embodiment of the present invention.
Figure 4:
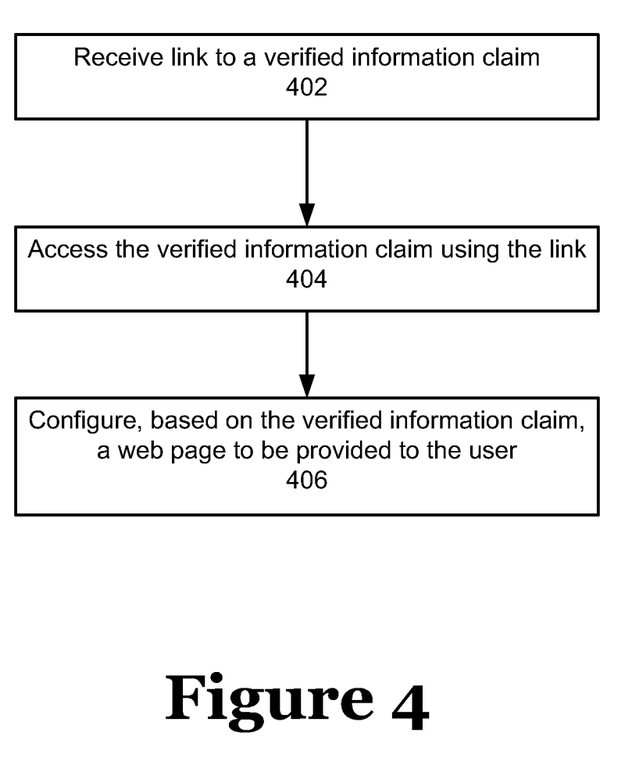
FIG. 4 is a flow diagram of a method for accessing a verified information claim and using the verified information claim to configure a web page according to an embodiment of the present invention.

FIGS. 3 and 4 depict methods according to certain embodiments for creating and using an information card. The methods are described with reference to the system implementation depicted in FIG. 1, but their implementation should not be so limited. The methods depicted in FIGS. 3 and 4 can be implemented using any suitable system.

FIG. 3 illustrates one method for generating an information card 116 to which access is configurable by the user 108 associated with the information card 116. In block 332, the card device 110 receives data elements with information about the user 108, including a data element with a verified information claim. The verified information claim can be received from the data engine 208 over the network 118 and can be verified using credit data associated with the user 108 and from the credit database 210. The verified information claim can be any type of information claim that is verifiable. Examples of such an information claim include identification, other demographic data, credit data (including consumer-type data), and financial information. The data elements can include additional information about the user 108, including unverified information. The data elements can be provided to the user 108 over the network 118.

In block 334, the card device 110 receives a command from the user 108 to allow the data element with the verified information claim to be accessible. For example, the data elements associated with the user 108 can be displayed to the user 108. The user can input a command by selecting one or more data elements to which to provide access to parties other than the user 108 and the card device 110. The card device 110 can receive the command over the network 118 and, in response to the command, designate the data element as being accessible to the other parties.

In block 336, the card device 110 receives a command to allow another data element to be inaccessible to a party other than the user 108 and an information card service provider. The information card service provider may control the card device 110, for example. In some embodiments, the information card service provider includes the entity in control of the card device 110 and the entity in control of the web server 200. The command can be received from the user 108 over the network 118 after the data elements are displayed to the user 108 and the user 108 inputs a command to designate that a data element is to be inaccessible.

In block 338, the card device 110 configures the information card 116 to provide access to the data element with the verified information claim and to prevent access to the other data element that is to be inaccessible. In some embodiments, the card device 110 causes a link to be created only to the data element with the verified information claim to which access has been allowed by the user 108 and does not create a link to the other data element to which access has been denied by the user 108.

In block 340, the card device 110 stores the information card 116 on a computer-readable medium, such as memory 114.

The information card 116 can be used by various websites to obtain verified information claims. Websites can use the information about the user to customize a user's experience at the website. FIG. 4 depicts one embodiment of a method for a website to customize a user's experience at the website based on a verified information claim. Although FIG. 4 is described with reference to using a verified information claim, embodiments of the method can be applied also to customizing a user's experience at a website using unverified information claims.

In block 402, the website device 300 receives a link to a verified information claim. The verified information claim may be in an element of a data file stored at a location over the network 118. It can be a claim that has been verified using credit data of the user 108 and that has been designated by the user as accessible to a third party, such as the website device 300. The link can be from the information card 116 and can be a location over the network 118 at which the verified information claim can be accessed. Examples of the verified information claim include demographic data of the user 108, financial information of the user 108, and an advertising preference of the user.

In block 404, the access engine 306 causes the website device 300 to access the verified information claim using the link. In some embodiments, the verified information claim can be accessed by the website device 300 without the website device 300 receiving an identity of the user.

In block 406, the access engine 306 causes the website device 300 to configure, based on the verified information claim, a web page to be provided to the user 108. For example, the access engine 306 can select an advertisement from a group of advertisements from advertisers 308 to which the verified information claim indicates the user may be interested and can cause the web page to include the advertisement. In some embodiments, the access engine 306 uses the verified information claim to formulate and conduct automatically a search of a database for information that may be of interest to the user 108.

In some embodiments, the website device 300 can add to the information associated with the information card 116. For example, the website device 300 can provide the customized web page to the user and can provide a session identifier to the card device 110. The session identifier may be cookie-type information that the card device 110 can associate with the user 108 through the information card 116.

Figure 5:
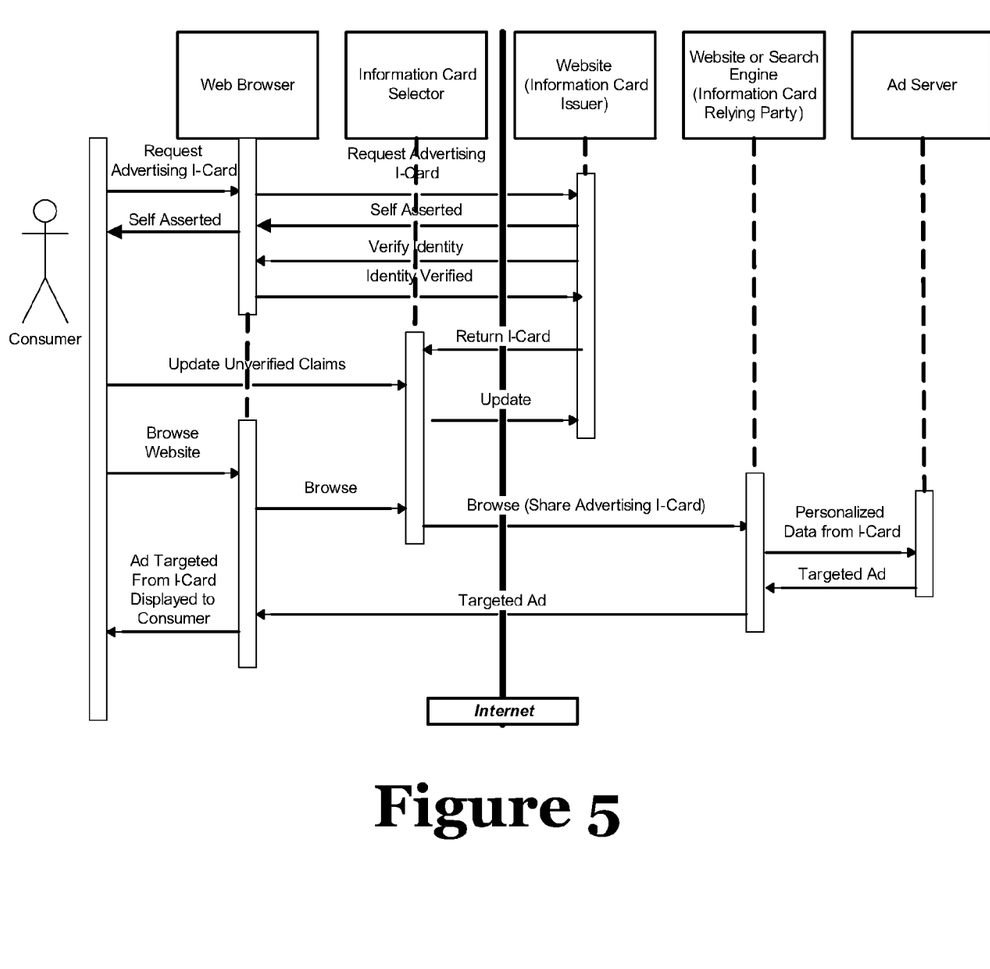
FIG. 5 is a process flow diagram of using an information card to customize a web site for a user according to an embodiment of the present invention.

FIG. 5 illustrates one advantage of using some embodiments of the present invention to provide targeted advertising to users based on information obtained via information card from an information database. A consumer that is a user requests an advertising i-card, referred to herein as an "information card" using a web browser. In the request, the user provides certain claims. A request for an information card is made to an information card issuer over a network. The card issuer also verifies an identity of the user by accessing credit data, for example, and requiring correct questions to be received from the user, where the questions are based on the credit data of the user. After verification, the card issuer returns an information card to an information card selector that is a digital wallet. The user can update unverified claims, as desired, by accessing the digital wallet. In some embodiments, the unverified claims can be verified by the card issuer or another party and the information associated with the information card can be updated accordingly.

The user can use a web browser to access a website associated with an information card relying party that is a website that can access information using information cards. The user can opt to share the information card with the relying party. In some embodiments, the user can select certain content representing personal information of the user to share with the relying party. The relying party can use the information in the information card to access content representing personal information of the user. The relying party can provide the personal information to an ad server that is configured to use the personal information to generate one or more targeted ads that are delivered to the user via a web page on a web browser.

Figure 6:
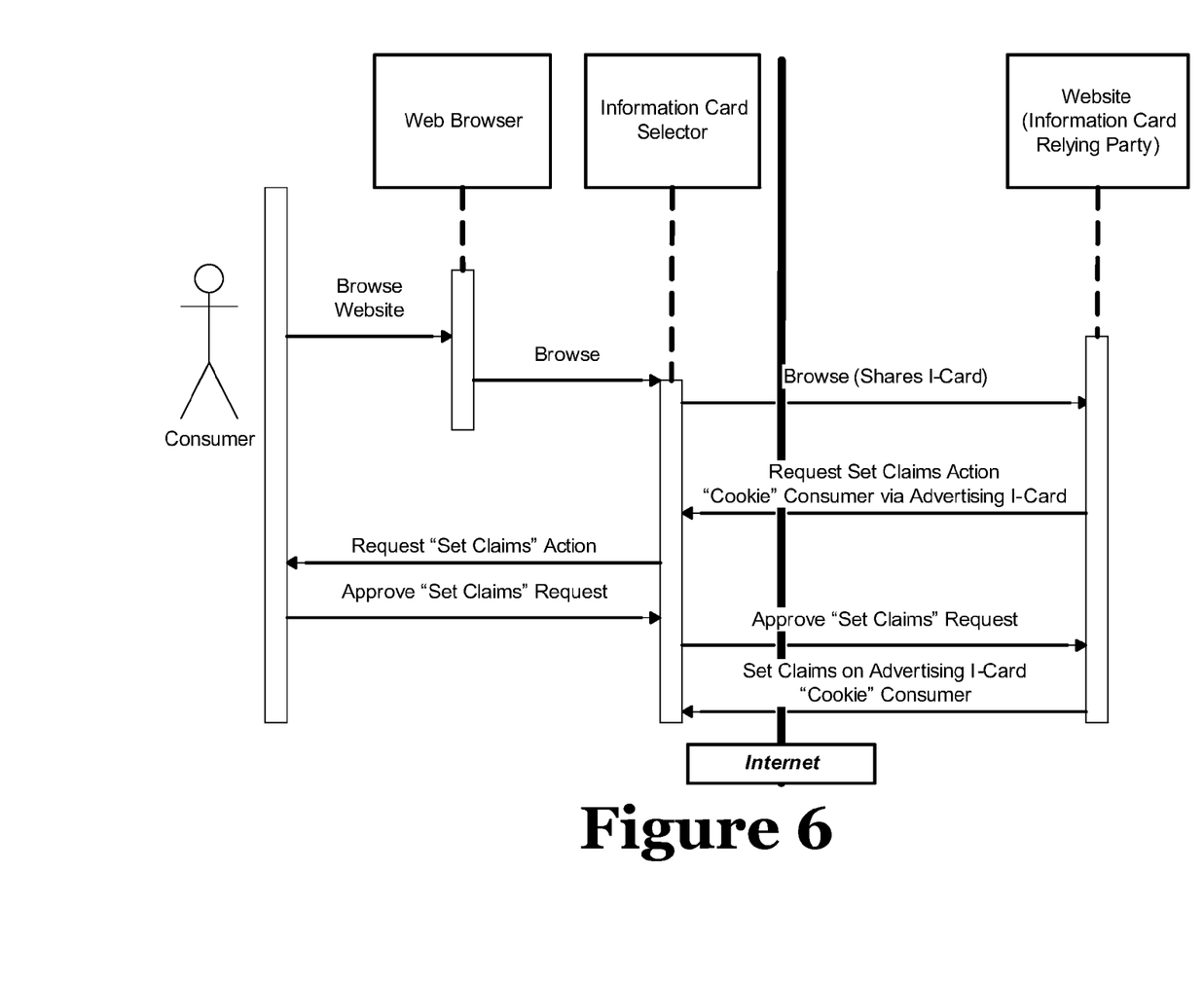
FIG. 6 is a process flow diagram of adding information to an information card by a website according to one embodiment of the present invention.

FIG. 6 illustrates one advantage of using certain embodiments of the present invention to include cookie-type information in the data file associated with a user. The user accesses an information card selector that is a digital wallet via a web browser to share an information card, previously established by the user and linked to an account hosted by a trusted third party, with a relying party. The user browsers the website of the relying party and may perform other actions, such as purchasing a product, while browsing the website. The relying party generates a "set claims" request to the user that includes a request to add cookie-type data to the data file associated with the user and located in an information database associated with a trusted party. The user approves the request and the relying party provides the "set claims", using the information card, to a web server associated with the information database. The web server adds the "set claims" as elements to the data file in the information database that is associated with the user.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. An information card stored on a computer-readable medium, the information card comprising:
a link capable of providing access to an information claim in an element of a data file, the information claim being associated with a user,
wherein the information claim is verified using credit data about the user,
wherein the information claim is designated by the user as capable of being accessed,
wherein the information claim is accessible via the link to configure a web page to be provided to the user without receiving an identity of the user.

2. The information card of claim 1, wherein the information claim is verified using credit data about the user by:
analyzing a credit file comprising credit data associated with the user;
generating at least one question and an answer to the at least one question based on the analyzing of the credit file comprising credit data associated with the user, the at least one question being associated with the information claim;
presenting the at least one question to the user; and
receiving the answer to the at least one question from the user.

3. The information card of claim 1, wherein the information claim is designated by the user as capable of being accessed by:
presenting a plurality of information claims to the user, the plurality of information claims comprising the information claim; and
receiving a designation associated with the information claim from the user, the designation representing that the user allows the information claim to be accessible using the information card.

4. The information card of claim 3, wherein the plurality of information claims comprises at least one other information claim that is not capable of being accessed by a party other than the user and an information card provider.

5. The information card of claim 1, wherein the information claim comprises at least one of:
demographic data of the user;
financial information of the user; or
an advertising preference of the user.

6. The information card of claim 1, wherein the information card is configurable to include a session identifier representing that the web page customized using the information claim was provided to the user.

7. The information card of claim 1, wherein the information claim is verified using credit data about the user prior to being stored on the computer-readable medium,
wherein the information claim is designated by the user as capable of being accessed prior to being stored on the computer-readable medium.

8. A method comprising:
receiving, by a processing device, a link to an information claim in an element of a data file, the link being associated with an information card of a user, wherein the information claim has been verified using credit data about the user and the information claim has been designated by the user as capable of being accessed;
accessing, by an access engine stored on a computer-readable medium and executed by the processing device, the information claim using the link;
configuring, by the processing device, a web page based on the information claim, wherein the web page is to be provided to the user, and accessing the information claim using the link and using the information claim to customizing the web page to be provided to the user without receiving an identity of the user.

9. The method of claim 8, further comprising:
providing to the user the web page customized using the information claim; and
providing a session identifier to the information card of the user, the session identifier representing that the web page customized using the information claim was provided to the user.

10. The method of claim 8, wherein configuring the web page based on the information claim comprises:
selecting, based on the information claim, an advertisement from a plurality of advertisements; and
configuring the web page to include the advertisement selected based on the information claim from the plurality of advertisements.

11. The method of claim 8, wherein configuring the web page based on the information claim comprises:
performing a search for information using the information claim; and
configuring the web page to include search results from the search for information using the information claim.

12. The method of claim 8, wherein the information claim comprises at least one of:
demographic data of the user;
financial information of the user; or
an advertising preference of the user.

13. A system comprising:
a processor:
a computer-readable medium having code stored thereon, the code being executable by the processor to cause the system to:
receive a link to an information claim in an element of a data file, the link being associated with an information card of a user, wherein the information claim has been verified using credit data about the user and the information claim has been designated by the user as capable of being accessed;
access the information claim using the link;
configure a web page based on the information claim, wherein the web page is to be provided to the user, and
access the information claim using the link and use the information claim to customizing the web page to be provided to the user without receiving an identity of the user.

14. The system of claim 13, wherein the code is executable by the processor to cause the system to:
provide to the user the web page customized using the information claim; and
provide a session identifier to the information card of the user, the session identifier representing that the web page customized using the information claim was provided to the user.

15. The system of claim 13, wherein the code is executable by the processor to cause the system to configure the web page based on the information claim by:
selecting, based on the information claim, an advertisement from a plurality of advertisements; and
configuring the web page to include the advertisement selected based on the information claim from the plurality of advertisements.

16. The system of claim 13, wherein the code is executable by the processor to cause the system to configure the web page based on the information claim by:
performing a search for information using the information claim; and
configuring the web page to include search results from the search for information using the information claim.

17. The system of claim 13, wherein the information claim comprises at least one of:
demographic data of the user;
financial information of the user; or
an advertising preference of the user.

18. A method comprising:
receiving a plurality of data elements comprising information about a user;
receiving a command at an information card device to allow at least one data element of the plurality of data elements to be accessible;
receiving a command at the information card device to allow at least one other data element of the plurality of data elements to be inaccessible to a party other than the user and the information card device;
configuring, by the information card device, an information card to include a link capable of providing access to the at least one data element and configuring the information card to prevent access to the at least one other data element, wherein the at least one other data element comprises an identity of the user, wherein the identity of the user has been authenticated; and
storing the information card on a computer-readable medium.

19. The method of claim 18, further comprising:
receiving a representation of web activity of the user;
storing the representation of the web activity of the user in a data element of the plurality of data elements.

20. The method of claim 18, wherein the plurality of data elements comprise a data element having at least one of:
demographic data of the user;
credit data of the user;
web activity history of the user;
financial information of the user; or
an advertising preference of the user.

21. The method of claim 18, wherein at least one of the plurality of data elements is verified using credit data about the user.

* * * * *